(12) United States Patent
Herron

(10) Patent No.: US 11,935,428 B1
(45) Date of Patent: Mar. 19, 2024

(54) NAVIGATION SYSTEM INTENDED FOR USE BY BLIND OR VISUALLY IMPAIRED PEOPLE

(71) Applicant: Chris Del Herron, Eagleville, TN (US)

(72) Inventor: Chris Del Herron, Eagleville, TN (US)

( * ) Notice: Subject to any disclaimer, the term of this patent is extended or adjusted under 35 U.S.C. 154(b) by 0 days.

(21) Appl. No.: 18/059,471

(22) Filed: Nov. 29, 2022

(51) Int. Cl.
| | | |
|---|---|---|
| G09B 21/00 | (2006.01) |
| G06F 3/16 | (2006.01) |
| H04R 1/02 | (2006.01) |
| H04R 1/40 | (2006.01) |
| H04R 3/12 | (2006.01) |
| H04R 5/02 | (2006.01) |
| H04S 7/00 | (2006.01) |
| H04W 84/12 | (2009.01) |

(52) U.S. Cl.
CPC ........... *G09B 21/006* (2013.01); *G06F 3/165* (2013.01); *H04R 1/026* (2013.01); *H04R 1/403* (2013.01); *H04R 3/12* (2013.01); *H04R 5/02* (2013.01); *H04S 7/30* (2013.01); *H04R 2201/401* (2013.01); *H04R 2420/07* (2013.01); *H04S 2400/11* (2013.01); *H04W 84/12* (2013.01)

(58) Field of Classification Search
CPC ....... G09B 21/006; G06F 3/165; H04R 1/026; H04R 1/403; H04R 3/12; H04R 5/02; H04R 2201/07; H04R 2420/07; H04S 7/30; H04S 2400/11; H04W 84/12
See application file for complete search history.

(56) References Cited

U.S. PATENT DOCUMENTS

| | | |
|---|---|---|
| 8,538,688 B2 | 9/2013 | Prehofer |
| 9,316,502 B2 | 4/2016 | Moore et al. |
| 9,539,164 B2 | 1/2017 | Sanders et al. |
| 9,629,774 B2 | 4/2017 | Dayal et al. |
| 11,000,442 B2 | 5/2021 | Ramos |
| 11,318,050 B2 | 5/2022 | Creasy et al. |
| 2013/0321175 A1* | 12/2013 | Kondo ..................... H04R 3/12 340/944 |

* cited by examiner

*Primary Examiner* — Andrew L Sniezek

(57) ABSTRACT

An orientation, navigation, and information system intended for use by blind or visually impaired people, characterized in that it enables the access to a plurality of reference information which is usually made available to users visually within a private facility using a user interface device comprising a wireless communicator, and an acoustic system containing a plurality of speakers, and a base charging station containing a plurality of charging docks, and a local wireless communication, these being implemented in and related to the places of interest in terms of useful information for the user.

19 Claims, 3 Drawing Sheets

NAVIGATION SYSTEM INTENDED FOR USE BY BLIND OR VISUALLY IMPAIRED PEOPLE

FIELD OF THE INVENTION

The present invention relates generally to navigational systems. More specifically, the present invention is a navigational system intended for use by blind or visually impaired people.

BACKGROUND OF THE INVENTION

In present times, days to day tasks such as getting up from bed and going to the bathroom are proven to be a challenge for the blind or visually impaired. Blind or visually impaired people are often put in situations where they do not have aid from caretakers or family members, therefore, would have to perform day to day tasks by themselves. In conventional systems, blind or visually impaired people would have to get by with a white cane in order to traverse and sense their surroundings but are often clumsy and hard to use in indoor environments. Oftentimes, blind or visually impaired people have to memorize their surroundings to be familiar with a household layout. This, however, takes a considerable amount of time. Furthermore, said household will need further accommodations such as braille signs in order for blind or visually impaired people to identify items, objects, or their surroundings. Therefore, it is an objective of the present invention to provide a means of navigation for blind or visually impaired people.

The present invention aims to solve these problems and limitations. The present invention provides an orientation, navigation, and information system intended for use by blind or visually impaired people, characterized in that it enables the access to a plurality of reference information which is usually made available to users visually within a private facility using a user interface device comprising a wireless communicator, and an acoustic system containing a plurality of speakers, and a base charging station containing a plurality of charging docks, and a local wireless communication, these being implemented in and related to the places of interest in terms of useful information for the user. Furthermore, the present invention is characterized in that the acoustic system is based in a plurality of acoustic signals, which the plurality of acoustic signals is coded along the plurality of speakers, wherein the plurality of speakers is duly positioned at the accesses to some designated areas in the private facility of so that they can support and guide, through auditory localization and spatial referencing, the navigation of the user towards reference points or locations of said designated areas which the user may be interested in.

SUMMARY OF THE INVENTION

The present invention provides an orientation, navigation, and information system intended for use by blind or visually impaired people, characterized in that it enables the access to a plurality of reference information which is usually made available to users visually within a private facility using a user interface device comprising a wireless communicator, and an acoustic system containing a plurality of speakers, and a base charging station containing a plurality of charging docks, and a local wireless communication, these being implemented in and related to the places of interest in terms of useful information for the user. Furthermore, the present invention is characterized in that the acoustic system is based in a plurality of acoustic signals, which the plurality of acoustic signals is coded along the plurality of speakers, wherein the plurality of speakers is duly positioned at the accesses to some designated areas in the private facility of so that they can support and guide, through auditory localization and spatial referencing, the navigation of the user towards reference points or locations of said designated areas which the user may be interested in.

DETAILED DESCRIPTION OF THE INVENTION

Figure 1:
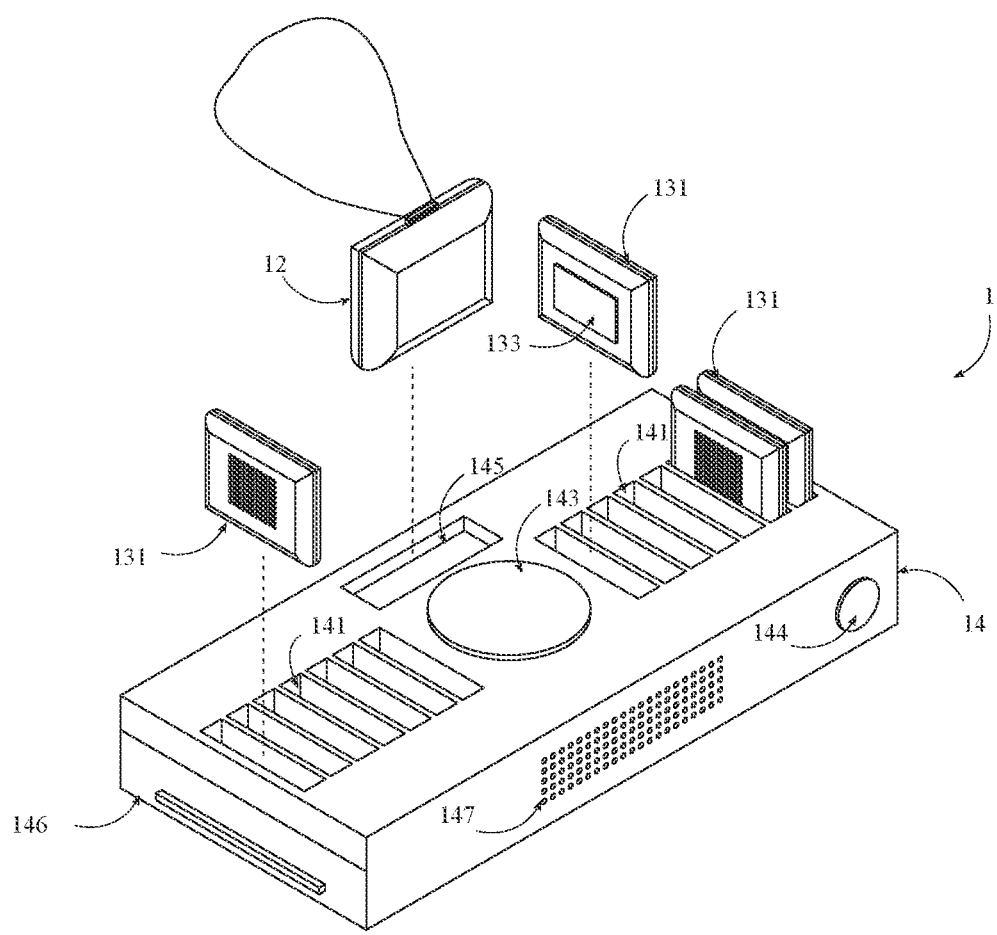
FIG. 1 is a flowchart illustrating overall process for the present invention.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, and devices for facilitating exchange and transaction of currencies, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Figure 2:
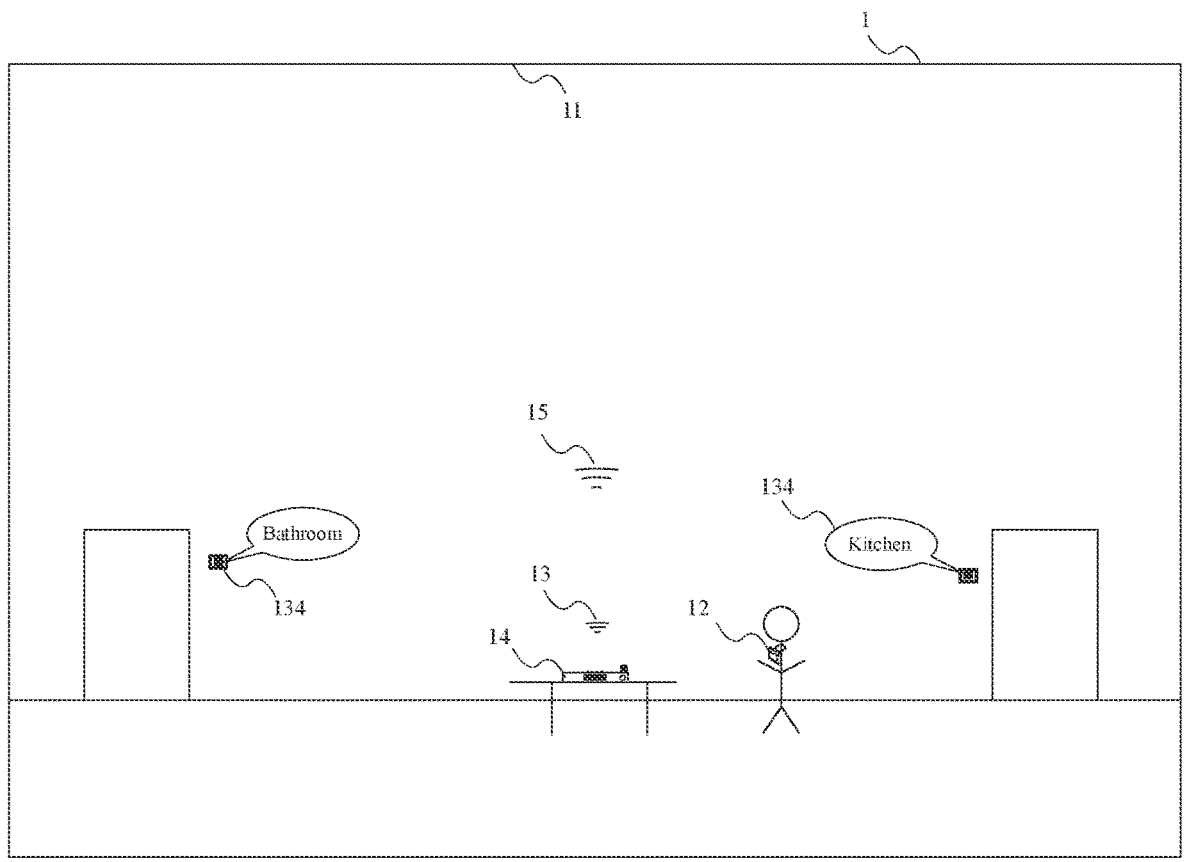
FIG. 2 is a flowchart illustrating continuing the overall process for the present invention from FIG. 1.
Figure 3:
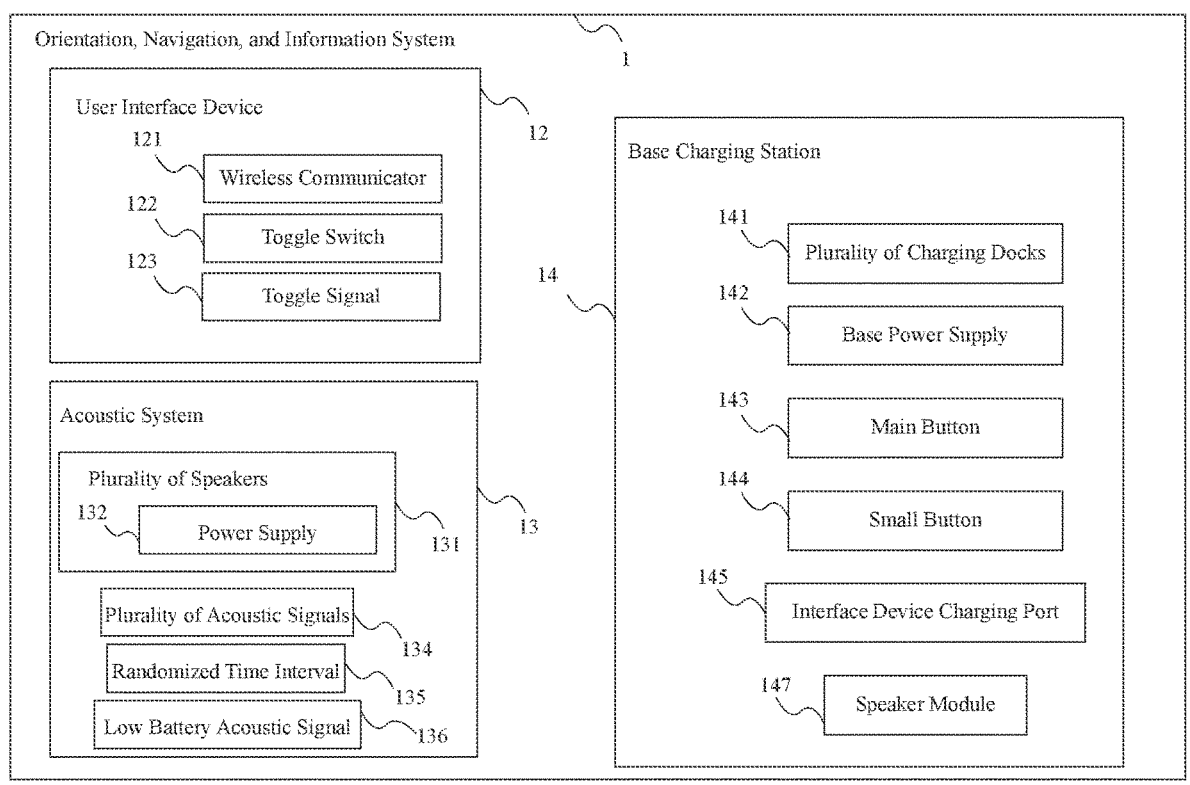
FIG. 3 is a flowchart illustrating continuing the overall process for the present invention from FIG. 2.

In reference to FIGS. 1-3, an orientation, navigation, and information system 1 intended for use by blind or visually impaired people is presented. The orientation, navigation, and information system 1 is characterized in that it enables the access to a plurality of reference information which is usually made available to users visually within a private facility 11 using a user interface device 12 comprises a wireless communicator 121, and an acoustic system 13 comprises a plurality of speakers 131, and a base charging station 14 comprises a plurality of charging docks 141, and a local wireless communication 15, these are implemented in and related to the places of interest in terms of useful information for the user. In the preferred embodiment, the present invention allows visually challenged person to navigate easily around their space or to find specific items. In the preferred embodiment, the user interface device 12 takes the form of a wearable remote suitable for activating or deactivating the acoustic system 13. In the preferred embodiment, the user interface device 12 is a wearable pendant. In the preferred embodiment, the user interface device 12 comprises a toggle switch 122, where the toggle switch 122 is communicably coupled with the wireless communicator 121, where the toggle switch 122 is configured to broadcast a toggle signal 123 in order to disable or enable the acoustic system 13. In the preferred embodiment, the user interface device 12 is a clamshell style button, where the toggle switch 122 is actuated by the clamshell style button. In the preferred embodiment, the wireless communicator 121 takes the form of any suitable wireless communication device that communicates with the local wireless communication 15 in order to communicably couple the user interface device 12 to the acoustic system 13. In the preferred embodiment, the acoustic system 13 takes the form of a system of wireless acoustic implements strategically placed along specified areas of the private facility 11, where the acoustic system 13 is configured to aid in navigation for the blind or visually impaired. In the preferred embodiment, the plurality of speakers 131 takes the form of any suitable wireless audio speaker. In the preferred embodiment, the base charging station 14 takes the form of a charging unit that allows the user to charge the user interface device 12 or the plurality of speakers 131 along the plurality of charging docks 141. In the preferred embodiment, the base charging station 14 is the only component connected to the main power of the private facility 11. The base charging station 14 further comprises a base power supply 142, where the base power supply 142 takes the form of a battery, allowing the base charging station 14 to serve as a movable central point along the private facility 11. In the preferred embodiment, the base charging station 14 is scaled to any suitable size, preferably handheld size. In the preferred embodiment, the plurality of charging docks 141 takes the form of a track across the top of the base charging station 14, where the plurality of speakers 131 slides within a small depression at each end of the base charging station 14, where the plurality of speakers 131 is staged for insertion into the plurality of charging docks 141 on the left and delivered after charging/programming on the right. The plurality of speakers 131 is only accessible at the left and right ends of the plurality of charging docks 141. The plurality of speakers 131 in between the left and right ends of the plurality of charging docks 141 are captured in place and charged. In the preferred embodiment, the base charging station 14 comprises a main button 143 that is configured for user interface responses along the base charging station 14. In the preferred embodiment, the base charging station 14 comprises a small button 144 on the side to activate the "Find my pendant" feature, where the "find my pendant" feature is configured to track and locate the user interface device 12. In the preferred embodiment, the base charging station 14 comprises an interface device charging port 145, where the interface device charging port 145 is configured to receive and charge the user interface device 12. In the preferred embodiment, the local wireless communication 15 takes the form of the local wireless network configured and coded to the private facility 11. In the preferred embodiment, the private facility 11 is a private household. In the preferred embodiment, the user interface device 12 is shaped smooth, symmetrical. Additionally, the user interface device 12 is dirt resistant and waterproof. The user interface device 12 is further shaped to complement the ornamental aesthetics of the user, where the user interface device 12 takes on the aesthetic appeal of jewelry or any other suitable ornamental article. In the preferred embodiment, the plurality of speakers 131 is shaped smooth and symmetrical.

In the preferred embodiment, the local wireless communication 15 is formed by Bluetooth or Wi-Fi data access systems, which are conventionally connected by Wi-Fi/WLAN or Ethernet/LAN to, at least, one server computer provided for that purpose on said private facility 11. In the preferred embodiment, the local wireless communication is of the Bluetooth-type. In the preferred embodiment, the local wireless communication 15 is of the DECT-type. In the preferred embodiment, the local wireless communication 15 or the user interface device 12 is of the SOFDMA, IEEE 802.16, WiMAX type.

In reference to FIGS. 2-3, the acoustic system 13 is based in a plurality of acoustic signals 134, which the plurality of acoustic signals 134 is coded along the plurality of speakers 131, where the plurality of speakers 131 is duly positioned at the accesses to some designated areas in the private facility 11 so that they can support and guide, through auditory localization and spatial referencing, the navigation of the user towards reference points or locations of said designated areas which the user may be interested in. In the preferred embodiment, the plurality of acoustic signals 134 is coded along the plurality of speakers 131, where the plurality of acoustic signals 134 is activated at a randomized time interval 135 along the plurality of speakers 131, where the randomized time interval 135 is configured to help distinguish between the plurality of acoustic signals 134. In the preferred embodiment, the randomized time interval 135 ranges from 0 to 3 seconds. In the preferred embodiment, the plurality of reference information is spoken information which will be transmitted by the plurality of speakers 131 and will allow the user to orientate and navigate within the private facility 11 through the spoken information. In the preferred embodiment, the user interface device 12 transmits a signal that causes the plurality of speakers 131 in the private facilitate to announce their coded spoken words along the coded randomized time interval 135. The randomized time interval 135 is provided in order to prevent the plurality of speakers 131 from talking at the same time. This allows the blind or visually impaired person to walk through the private facility 11 using location by sound in order to navigate around or to any place the acoustic system 13 is installed.

In reference to FIG. 1, the user interface device 12 is a pendant style device worn around the neck or wrist like a watch. In the preferred embodiment, the user interface device 12 comprises a clamshell style button, where the mechanism of the clamshell style button is configured to provide ease of accessibility for the blind or visually impaired person, where the blind or visually impaired person may apply pressure along the clamshell style button on any direction in order to activate the user interface device 12. In the preferred embodiment, the user interface device 12 is scaled to any suitable size. In one embodiment, the user interface device 12 is scaled to complement the ornamental design of jewelry wear.

In reference FIG. 3, the plurality of reference information comprises a low battery acoustic signal 136, where the low battery acoustic signal 136 will be transmitted by the plurality of speakers 131 when a power supply 132 of the plurality of speakers 131 is low in power and will allow the user to locate the speaker with low power. In the preferred embodiment, the plurality of speakers 131 each comprises the power supply 132, where the plurality of charging docks 141 is configured to receive and charge the power supply 132 of the plurality of speakers 131 and will allow the user to charge the power supply 132 of the speaker with low power. In the preferred embodiment, the low battery acoustic signal 136 may take the form of a spoken word audio signal saying "Please Charge" followed by the encoded spoken word of the exact speaker.

In reference to FIG. 1, the base charging station 14 is configured to receive the plurality of speakers 131, where the base charging station 14 is configured to receive a spoken word input from the user, where the base charging station 14 is configured to code the spoken word input into the speaker. In the preferred embodiment, the plurality of speakers 131 is programmed along the base charging station 14 by the user inserting one of the plurality of speakers 131 along one of the plurality of charging docks 141 along the base charging station 14. The base charging station 14 then instructs the user to program the speaker with the spoken word input. In the preferred embodiment, the speaker is programmed by the user placing the speaker along the left end of the plurality of charging docks 141. The base charging station 14 senses the speaker and states "press the main button 143 once to charge/copy or twice to program a new speaker". If the main button 143 is pressed once, the base charge initiates a charge sequence and initiates the copy protocol, where the base charging station 14 instructs the user to "press the button once, say the name, then press the button again". The base charging station 14 records what the user says then removes the dead airtime at the front and the back of the name. It then copies what the user had named the speaker to the next fully charged speaker in the right end of the plurality of charging docks 141. The base charging station 14 then instructs the user to "Insert next speaker to be charged". When the user slides the button located in the left depression into the plurality of charging docks 141, it causes the speaker which has just been programmed in the right end of the track to be pushed out the right end of the track into the parking depression ready for placement.

If pressed twice, the base station then initiates the speaker programming protocol, where the base charging station 14 reads the name recorded on the speaker that has been placed in the left side of the plurality of charging docks 141. The base charging station 14 then copies that name to the last button in the right end of the track. The base charging station 14 then instructs the user to "Insert the speaker to be charged into the left end of the track". This ejects the last speaker in the track on the right side which has just been programmed into the parking depression on the right. This allows the user to immediately replace a discharged speaker with a charged speaker without reprogramming. In the preferred embodiment, the base charging station 14 comprises a speaker module 147, where the speaker module 147 is communicably coupled with the acoustic system 13 such that the speaker module 147 emits a base speaker audio output, where the base speaker audio output is configured to allow the user to locate and track the base charging station 14.

In reference to FIG. 1, the plurality of speakers 131 each comprises a mounting element 133, where the mounting element 133 is configured to mount the plurality of speakers 131 to the designated areas. In the preferred embodiment, the mounting element 133 is a mounting hook. In the preferred embodiment, the mounting element 133 is a magnetic fastener. In the preferred embodiment, the mounting element 133 is an adhesive backing. In the preferred embodiment, the mounting element 133 is configured to facilitate the attachment of the plurality of speakers 131 such that they attach along items, locations, or surfaces without specific alignment.

In reference to FIG. 1, all features of the base charging station 14 should be obvious the user without sight, the main button 143 is large and prominent along the base charging station 14. The plurality of charging docks 141 takes the form of a track-style stock, where the charging depressions are prominent. The base charging station 14 further comprises a storage drawer 146, where the storage drawer 146 stores an ample supply of unused plurality of speakers 131.

Although the invention has been explained in relation to its preferred embodiment, it is to be understood that many other possible modifications and variations can be made without departing from the spirit and scope of the invention as hereinafter claimed.

What is claimed is:

1. An orientation, navigation, and information system intended for use by blind or visually impaired people, characterized in that it enables the access to a plurality of reference information which is usually made available to users visually within a facility using a user interface device comprising a wireless communicator, and an acoustic system comprising a plurality of speakers, and a base charging station, which allows for charging the user interface and speakers, comprising a plurality of charging docks, and a local wireless communication, wherein the wireless communicator communicates wirelessly with the local wireless communication in order to communicably couple the user interface device, these being implemented in and related to the places of interest in terms of useful information for the user.

2. An orientation, navigation, and information system according to claim 1, characterized in that the acoustic system is based in a plurality of acoustic signals, which the plurality of acoustic signals is coded along the plurality of speakers, wherein the plurality of speakers is duly positioned at the accesses to some designated areas in the facility of so that they can support and guide, through auditory localization and spatial referencing, the navigation of the user towards reference points or locations of said designated areas which the user may be interested in.

3. An orientation, navigation, and information system according to claim 2, characterized in that the plurality of acoustic signals are coded along the plurality of speakers, wherein the plurality of acoustic signals is activated at a randomized time interval along the plurality of speakers, wherein the randomized time interval is configured to help distinguish between the plurality of acoustic signals.

4. An orientation, navigation, and information system according to claim 3, characterized in that the randomized time interval ranges from 0 to 3 seconds.

5. An orientation, navigation, and information system according to claim 2, characterized in that the plurality of reference information is spoken information which will be transmitted by the plurality of speakers and will allow the user to orientate and navigate within the facility through the spoken information.

6. An orientation, navigation and information system according to claim 5, characterized in that the base charger is configured to receive the plurality of speakers, wherein the base charger is configured to receive a spoken word input from the user, wherein the base charger is configured to code the spoken word input into the speaker.

7. An orientation, navigation and information system according to claim 2, characterized in that the plurality of speakers each comprising a mounting element, wherein the mounting element is configured to mount the plurality of speakers to the designated areas.

8. An orientation, navigation and information system according to claim 7, characterized in that the mounting element is a mounting hook.

9. An orientation, navigation and information system according to claim 7, characterized in that the mounting element is an adhesive backing.

10. An orientation, navigation, and information system according to claim 1, characterized in that the plurality of reference information comprising a low battery acoustic signal, wherein the low battery acoustic signal will be transmitted by the plurality of speakers when a power supply of the plurality of speakers is low in power and will allow the user to locate the speaker with low power.

11. An orientation, navigation, and information system according to claim 10, characterized in that the plurality of speakers each comprising the power supply, wherein the plurality of charging docks is configured to receive and charge the power supply of the plurality of speakers and will allow the user to charge the power supply of the speaker with low power.

12. An orientation, navigation and information system according to claim 1, characterized in that the local wireless communication are formed by Bluetooth or Wi-Fi data access systems, which are conventionally connected by Wi-Fi/WLAN (Wireless Local Area Network) or Ethernet/LAN (Local Area Network) to, at least, one server computer provided for that purpose on said facility.

13. An orientation, navigation and information system according to claim 1, characterized in that the local wireless communication is of the Bluetooth-type.

14. An orientation, navigation and information system according to claim 1, characterized in that the local wireless communication is of the DECT-type (Digital Enhanced Cordless Telecommunications).

15. An orientation, navigation and information system according to claim 1, characterized in that the local wireless communication or the user interface device is of the SOFDMA (Scalable Orthogonal Frequency-Division Multiple Access), IEEE 802.16 (Institute of Electrical Electronics Engineers), WiMAX type (Worldwide Interoperability for Microwave Access).

16. An orientation, navigation and information system according to claim 1, characterized in that the facility is a private household or any area accessed by blind or visually impaired.

17. An orientation, navigation and information system according to claim 1, characterized in that the user interface device is a wearable pendant.

18. An orientation, navigation and information system according to claim 1, characterized in that the user interface device comprises a toggle switch, wherein the toggle switch is communicably coupled with the wireless communicator, wherein the toggle switch is configured to broadcast a toggle signal in order to enable the acoustic system.

19. An orientation, navigation and information system according to claim 18, characterized in that the user interface device is a clamshell style button, wherein the toggle switch is actuated by the clamshell style button.

* * * * *